United States Patent [19]

Shoup et al.

[11] Patent Number: 5,345,684
[45] Date of Patent: Sep. 13, 1994

[54] FLEXIBLE LINE TRIMMER HAVING AN ANTI-VIBRATION HANDLE

[75] Inventors: Michael W. Shoup; David C. Allis; Paul A. Warfel, all of Shreveport, La.

[73] Assignee: WCI Outdoor Products, Inc., Cleveland, Ohio

[21] Appl. No.: 7,491

[22] Filed: Jan. 25, 1993

[51] Int. Cl.⁵ .................. B26B 7/00; F16M 13/04
[52] U.S. Cl. .................... 30/276; 248/610
[58] Field of Search ........ 30/276, 272.1, 610; 248/560, 610; 188/371, 268; 74/574; 173/162.1, 162.2

[56] References Cited

U.S. PATENT DOCUMENTS

| | | |
|---|---|---|
| 3,581,832 | 6/1971 | Hebsack . |
| 4,079,926 | 3/1978 | Nunes ................................. 248/610 |
| 4,174,189 | 11/1979 | Elson ................................. 248/610 |
| 4,179,805 | 12/1979 | Yamada . |
| 4,236,310 | 12/1980 | Miller . |
| 4,451,983 | 6/1984 | Johnson et al. . |
| 4,599,796 | 7/1986 | Baba ................................. 30/276 |
| 4,759,128 | 7/1988 | Katoh et al. ...................... 30/276 |
| 4,819,742 | 4/1989 | Driggers . |
| 4,825,548 | 5/1989 | Driggers ........................... 30/276 |
| 4,916,886 | 4/1990 | Nakamura et al. ................ 30/276 |
| 5,031,323 | 7/1991 | Honsa et al. ...................... 30/276 |
| 5,097,566 | 3/1992 | Decker et al. .................... 30/276 |

Primary Examiner—Richard K. Seidel
Assistant Examiner—Paul M. Heyrana, Sr.
Attorney, Agent, or Firm—Marc A. Hubbard

[57] ABSTRACT

A flexible line trimmer with a vibration dampening support handle includes a rotary power source and a rotatable trimmer head, both of which are connected by a drive shaft enclosed in a rigid housing. A flexible line trimmer has a vibration dampening rear support handle assembly and a front control handle. The rear handle assembly is resiliently coupled to the drive shaft housing and to the power source housing.

4 Claims, 5 Drawing Sheets

FLEXIBLE LINE TRIMMER HAVING AN ANTI-VIBRATION HANDLE

FIELD OF THE INVENTION

The present invention relates generally to a flexible line trimmer, and more particularly to a flexible line trimmer powered by an internal combustion engine with a vibration dampening rear support handle.

BACKGROUND OF THE INVENTION

Flexible line trimmers that utilize a spinning trimmer head to flail a short piece of flexible line next to the ground to cut vegetation are well known in the prior art. Flexible line trimmers assume many configurations, depending in part on whether they are powered by an electric motor or a two stroke internal combustion engine. Electric trimmers usually have an electric motor mounted next to the trimmer head on one end of a rigid tube, and at the other end of the shaft, a rear handle for manually gripping. Midway on the shaft is a forward handle. Internal combustion engines, because they tend to be larger and heavier than electric motors, are usually mounted at the end of a rigid tube opposite the spinning trimmer head. This provides better balance and thus comfort of use and control. A flexible drive shaft inside the tube couples the engine output to the trimmer head. Either a rear handle is mounted to the front or rear of an engine housing, or simple grip circumscribing the tube in front of the engine is provided for holding the trimmer in the rear. In some cases, heavy duty trimmers with comparatively large engines are carried on a harness worn by the operator.

The engine, shaft and spinning head create a significant amount of vibration during operation. The vibrational forces are transmitted to the handles of the trimmer and then to the hands of its operator, causing discomfort and possible injury to the operator.

Attempts to reduce transmission of vibration to the operator have been made. Generally, these attempts focus on isolating the front hand grip since the drive shaft carries a great deal of vibrational energy from the trimmer head, the engine and the drive shaft. Although there are many different designs, resilient bushings are typically inserted between the hand grip and the handle or between the handle and the tube to isolate the hand and dampen transmission vibration. Where the hand grip is provided directly on the drive shaft, it is made of a resilient material or has a resilient structure for dampening. Open loop handle configurations have also been used which render the overall handle somewhat flexible.

Vibration isolating and dampening structures do not appear to be generally used to isolate rear handles that are mounted to housings of engines. Engine housings inherently provide some isolation and dampening. So long as the handle is not attached to the drive shaft, there is some dampening. Some other types of portable lawn and garden equipment have used resilient couplings for the rear handle. However, unlike most other types of lawn and garden equipment, a rear handle on a trimmer is required not only to support the weight of the trimmer, but also to support torquing forces applied to the handle by foreaft tilting of the trimmer and twisting of the trimmer, especially where the trimmer is not well balanced.

SUMMARY OF THE INVENTION

The invention is a trimmer, powered by an internal combustion engine, having anti-vibration rear support handle with a configuration that is slim, compact and well balanced, making the trimmer safe and comfortable for the operator to use.

The trimmer has several inventive aspects. The anti-vibration handle is L-shaped. It is coupled through vibration dampening mountings to a forward face of a power source housing and a drive shaft housing. It is well balanced in a forward and aft direction about the rear handle, allowing easy maneuvering using one hand and improving the vibration dampening characteristics of the handle. A starter cord is located forward of the housing and under the rear handle so that it can be comfortably pulled while holding the trimmer in a balanced state with the other hand, gripping the rear support handle. Exhaust gases are mixed with cooling air and discharged through the rear of the engine housing, away from an operator who stands on either side of the trimmer and places his hands in front.

The arrangement of the two-stroke internal combustion engine power source not only provides good balance and the other advantages mentioned, it also meets operational demands of the internal combustion engine. A cantilevered crankshaft extends forwardly and is coupled to a drive shaft through a flywheel fan. The cantilevered crankshaft is relatively short, reducing the length of the engine and providing for placement of a carburetor immediately aft of the crankcase along the crankshaft's axis. The engine's cylinder is oriented vertically upward from the crankshaft. The vertical orientation makes the power source housing slim, and thus more comfortable to hold by one's side. Extending the cylinder upward also provides a face to which to couple the L-shaped handle without increasing the size of the power source housing. And furthermore, the unbalanced inertia forces of the engine and the unbalanced forces on the cantilevered crankshaft are predominantly within a vertical plane with the L-shaped handle, improving the vibration dampening and control characteristics of the handle.

The flywheel fan draws cooling air into the housing through intake openings around the drive shaft housing, below the handle, and then blows it up through the housing, past a cylinder and muffler mounted aft of the cylinder, cooling first the cylinder and then the muffler. The cooling then exits the back of the housing mixed with exhaust gas. A wall in the engine housing defining the path the blown cooling air takes also tends to act as a thermal between the carburetor and muffler that, in addition to the blown cooling air sweeping away heat from the muffler, helps to keep the carburetor from getting too hot. A starter pulley is forward of the flywheel and mounted around the drive shaft and engages the flywheel to crank the engine. An air filter is located on the rear of the housing, immediately aft of the carburetor, to distance it from the dirt and debris kicked up during operation of the trimmer and thereby keep it cleaner.

These and other inventive aspects, features and objectives will be described or apparent from the following description of the preferred embodiment.

BRIEF DESCRIPTION OF THE DRAWINGS

The invention will be further described in connection with the accompanying drawings illustrating the preferred embodiment, in which.

DETAILED DESCRIPTION OF PREFERRED EMBODIMENT

Figure 1:
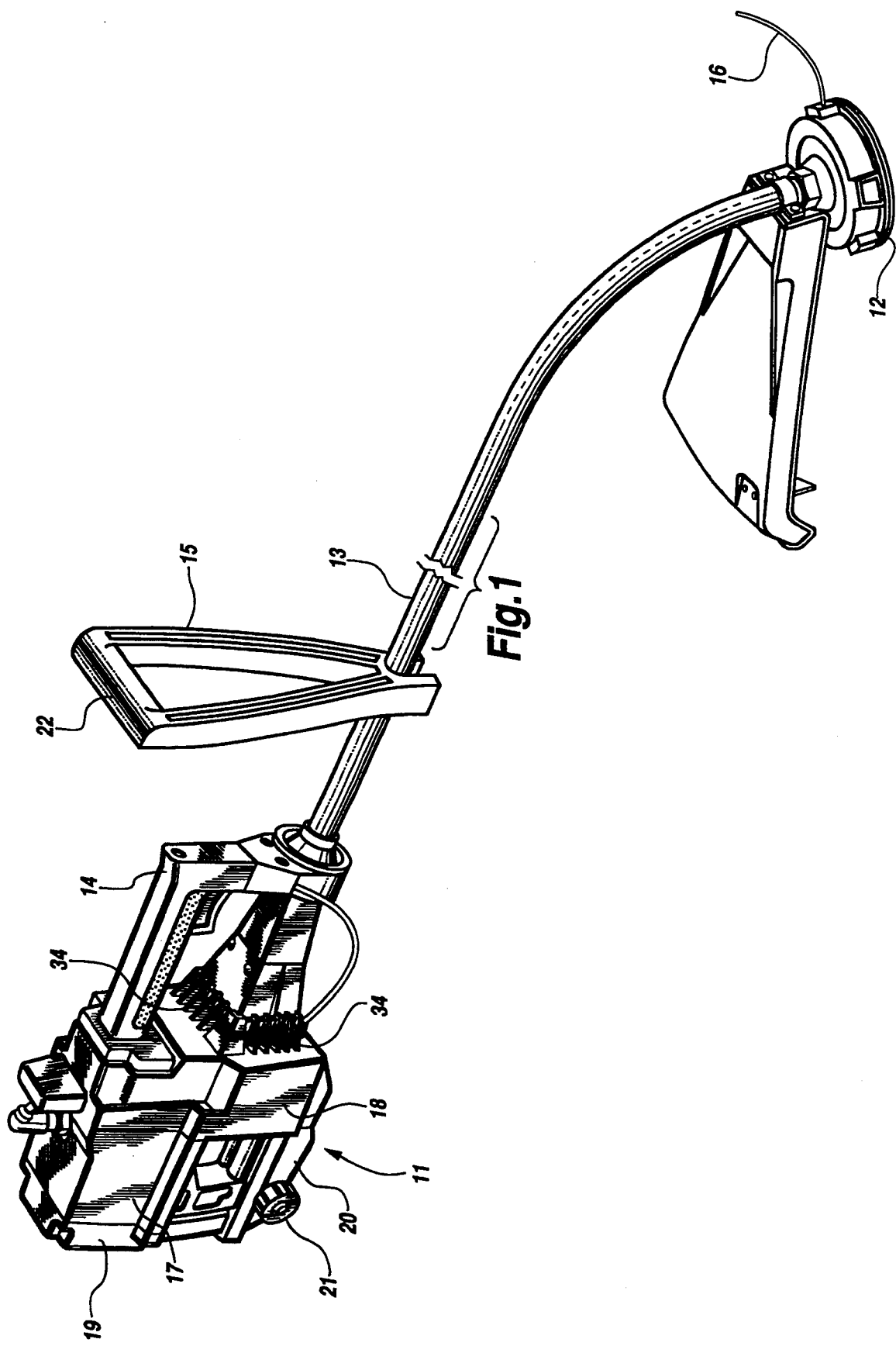
FIG. 1 is a perspective view of a flexible line trimmer assembly constructed according to the teachings of the present invention.

Perspectively illustrated in FIG. 1 is a flexible line trimmer 10 having an internal combustion engine power source 11 and a trimmer head 12. Power source 11 and trimmer head 12 are structurally connected by drive shaft housing 13. The trimmer 10 also has a rear support handle 14 and a forward assist handle 15. Forward assist handle 15 has front grip portion 22. Trimmer head 12, having well known construction for storing a supply of flexible line, rotates to flail flexible line extension 16 for cutting vegetation and the like. A cowling for the power source 11 includes engine housing 17 that covers a cylinder (not seen) of an engine and blower housing 18 that encloses a cooling fan (not seen). The back of trimmer 10 is covered by air filter housing 19.

Fuel tank 20 is mounted under crankcase 11 with fill cap 21 positioned on the side of trimmer 10. The position of fill cap 21 allows the operator to conveniently fill the fuel tank 20 when the trimmer 10 is laying on its side, so the operator is not required to support the trimmer 10 when he is filling the fuel tank 20.

Figure 2:
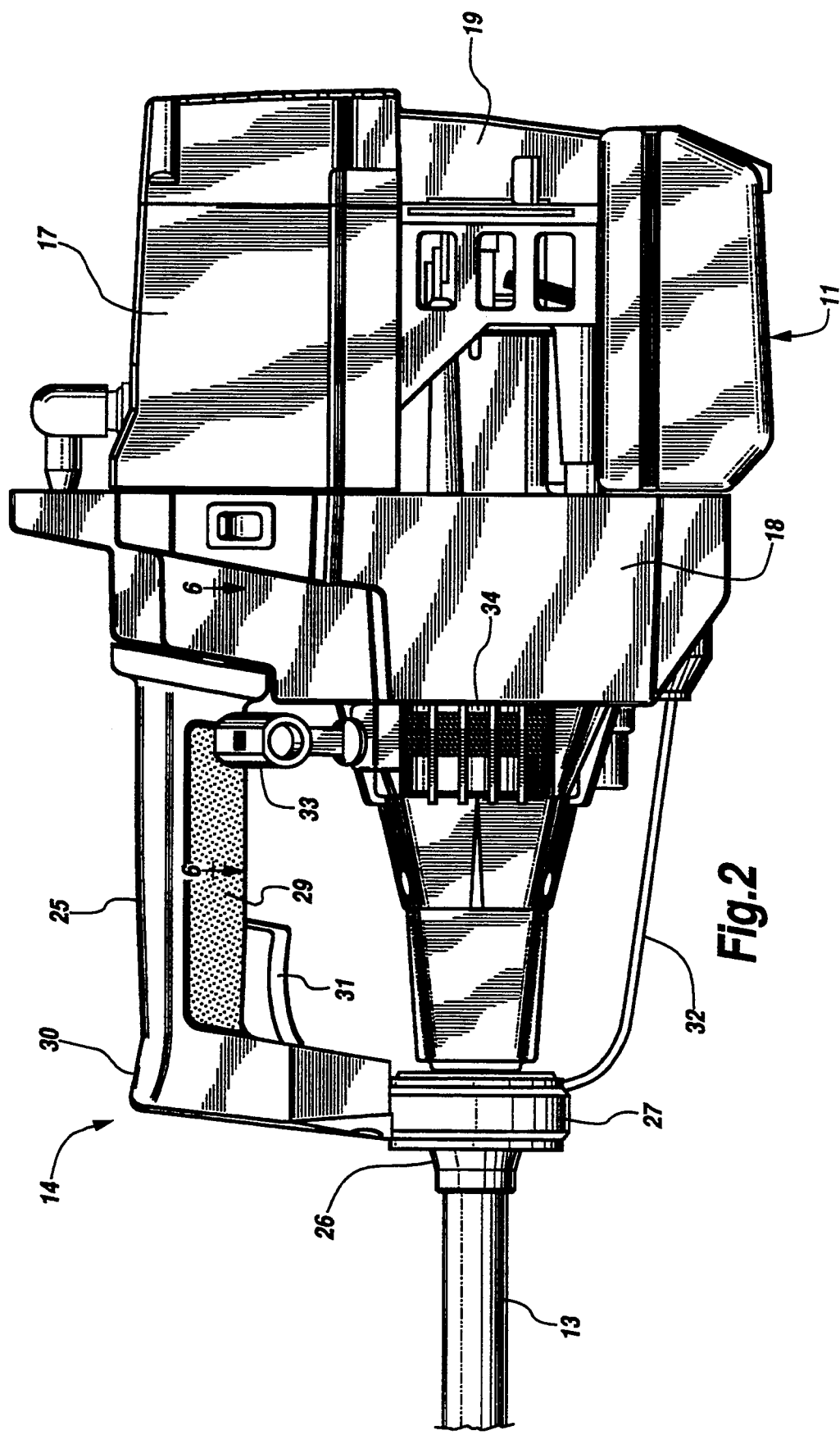
FIG. 2 is a side view of a power source housing, drive shaft housing, and rear support handle shown in FIG. 1.
Figure 3:
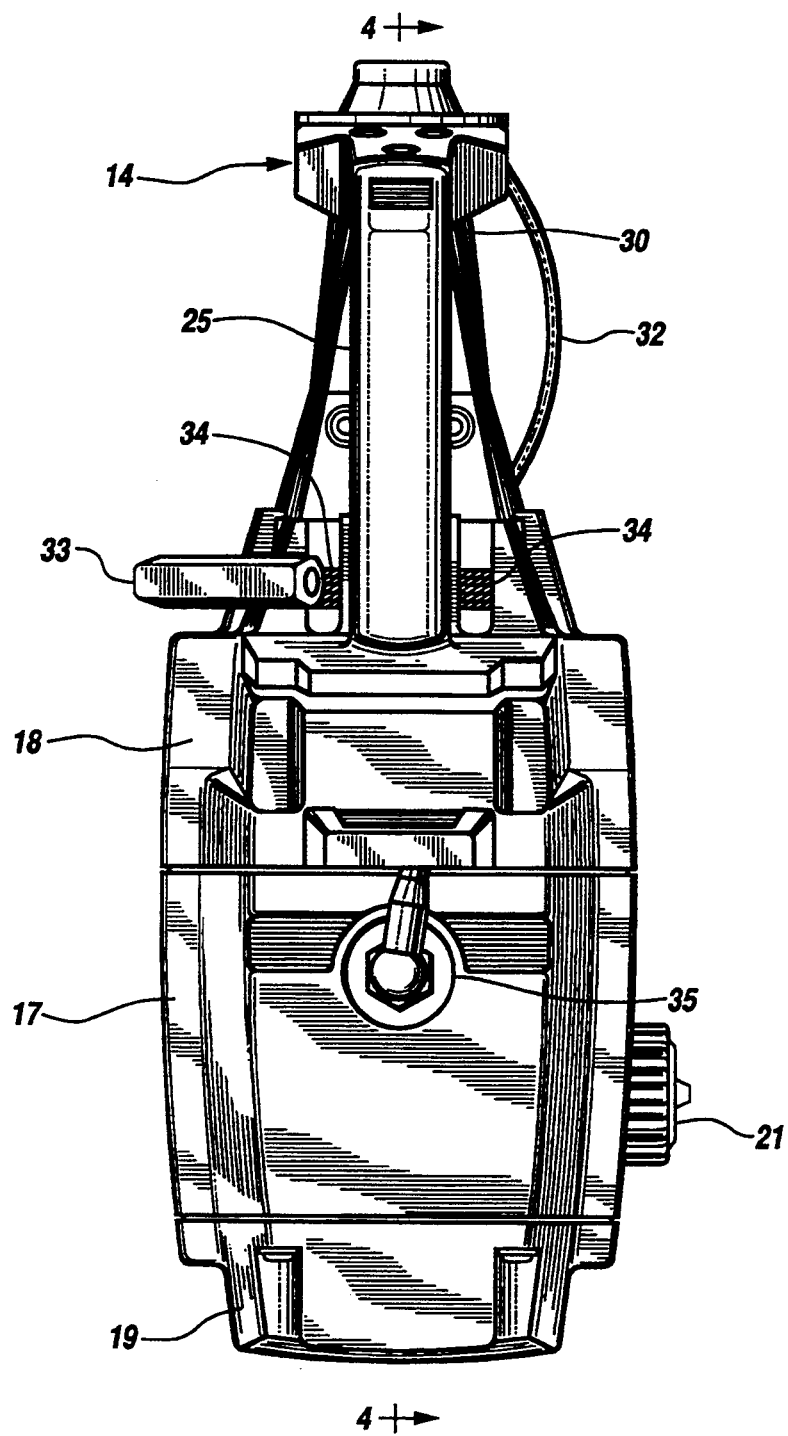
FIG. 3 is a top view of the power source housing, the drive shaft housing and the support handle shown in FIG. 1.

Referring now to FIGS. 2 and 3, rear support handle 14 includes L-shaped support member 25 attached to a resilient dampening member 26. The resilient dampening member 26 is a rubber spring which coaxially circumscribes drive shaft housing 13 to provide vibration dampening in all radial directions from the shaft. Support member 25 includes a ring 27 at one end which coaxially circumscribes resilient dampening member 26. The oppositely disposed end of support member 25 is coupled to the front side of blower housing 18 with a resilient, vibration dampening member.

A hand grip portion 29 of handle 14 is positioned forward of the power source 11 and above the drive shaft housing 13. Hand grip 29 includes a slightly roughened underside to promote gripping and a thumb support 30 that permits the operator to more easily control the pitch of the trimmer with one hand. The operator controls throttle trigger 31 with an index finger. The trigger is connected to the carburetor with a sheathed throttle cable 32. Starter rope handle 33 is located under support handle 14 to allow the operator to hold the trimmer comfortably and in a balanced state with one hand gripping handle 14 while pulling on the starter rope handle. The starter pulley is enclosed by a forwardly extending portion of blower housing 18 that encircles the drive shaft 13. The extension of blower housing 18 also has defined slots 34 through which cooling air is drawn by a blower. Sparkplug 35 extends through the top of engine housing 17.

The support member 25 of handle 14 is positioned directly above and substantially parallel to the drive shaft housing 13.

Figure 4:
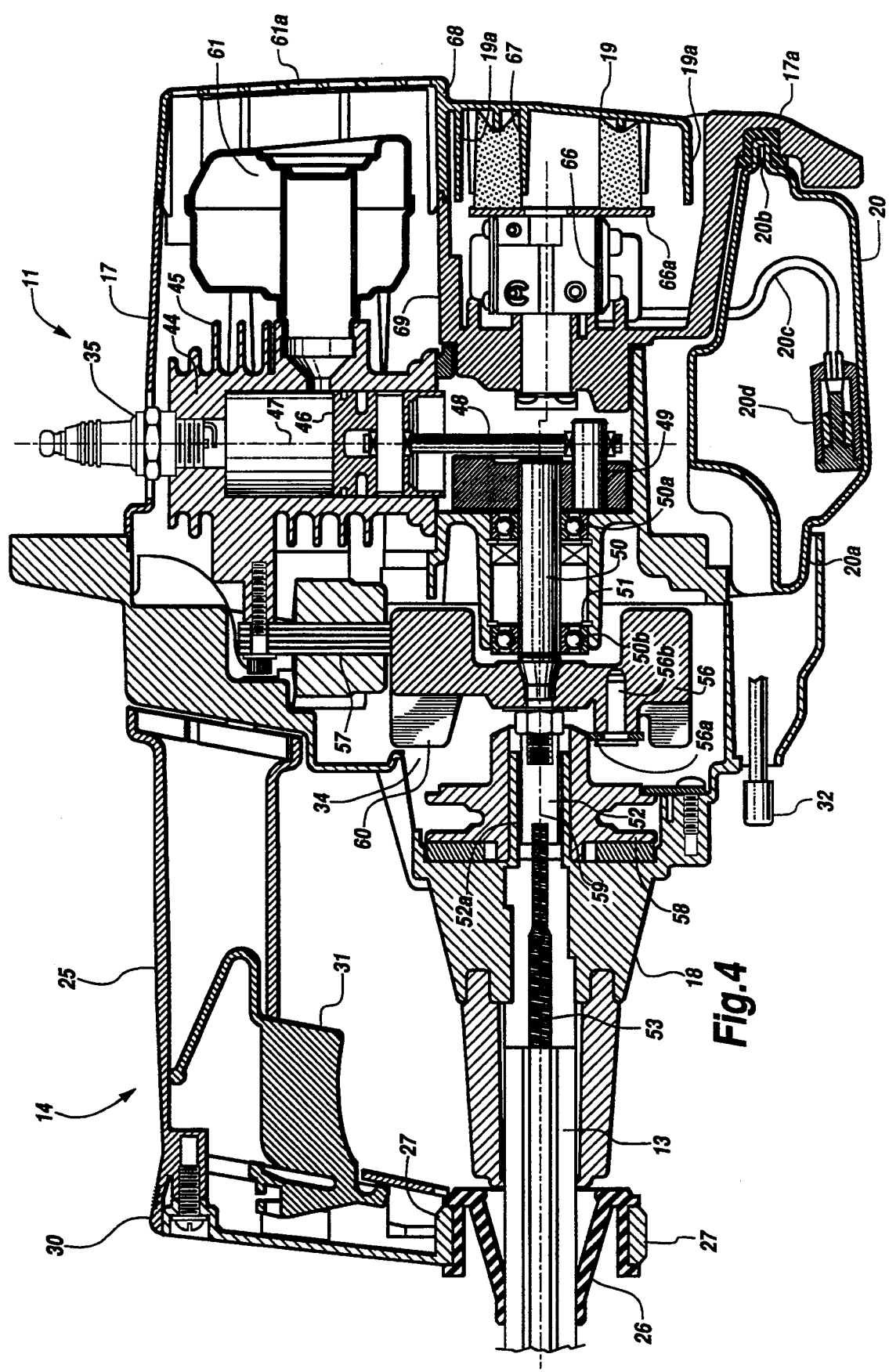
FIG. 4 is a sectional view taken along line IV—IV of FIG. 3.

Referring now to FIG. 4, internal combustion engine is two stroke and air cooled. It includes a cylinder 44 provided with a plurality of externally disposed cooling vanes 45. A piston 46 having a longitudinal axis 47 is mounted for reciprocal movement within the bore of the cylinder in the conventional manner and is coupled through a connecting rod 48 to a crank arm 49. The connecting rod 48 is mounted for rotation about the crank arm 49. According to this arrangement, reciprocal movement of the piston 46 within the bore of the cylinder 44 is translated into rotation of a crankshaft 50.

Crankshaft 50 is supported in a cantilevered manner for rotation within crankcase 51 by rocker bearings 50a and 50b. The cantilevered configuration is more economical to manufacture and easier to assemble than a conventional balanced crankshaft. It also is comparatively shorter than balanced crankshafts, permitting a more compact arrangement of components and better balance, placing the heaviest components of the engine closer to the handle 14. The forward end of crankshaft 50 is connected to a coupling member 52 that is carried for rotation within a shaft 52a integrally formed in blower housing 18. The coupling member includes a keyhole that receives a flat end of drive shaft 53 to couple the drive shaft to the crankshaft for rotation.

Flywheel 56 is attached to the forward end of the crankshaft, before the coupling member, and rotated by the crankshaft. Flywheel 56 includes a permanent magnet which is magnetically coupled in a conventional manner to solid state ignition module 57 for developing ignition current. The ignition current is applied to the electrodes of a spark plug 35. A plurality of blades 60 are secured to the flywheel 56 to form an impeller of a radial flow centrifugal fan. When the flywheel 56 rotates, cooling air is drawn into the center of the fan through air intake openings 34 and then radially out along its periphery under pressure. A scroll-shaped involute for the impeller, not shown in the cross-section, is formed by walls extending from the interior surface of blower housing 18. The involute discharges a stream of cooling air upwardly within the blower housing and into the engine housing 17. The stream is forced to pass first over the cooling vanes 45 found on the exterior of cylinder 44 and then past muffler 61, cooling first the cylinder and then the muffler. The cooling air then exits the engine housing, mixed with exhaust gas discharged from the muffler, through ventilation openings 61a in air filter housing 19 on the backside of the engine housing, away from the operator and the operator's hands. The mixed gases tend to be cooler than just the exhaust gas.

A recoiling starter pulley assembly 58 is carried for rotation on shaft 52a. Shaft 52a is integrally formed with blower housing 18. A rope, shown only in FIG. 2, is wound about the starter pulley. A spring (not shown) applies a biasing force to rotate the pulley to recoil the rope on the pulley in a conventional manner when not being pulled. The starter pulley includes a ratchet portion 58b that is coaxial with shaft 52a and extending toward flywheel 56. The ratchet has inclined teeth, conventionally formed (not clearly shown) which extend laterally outwardly from its circumference and into which dawgs 56a drop for imparting rotation in only one direction. Dawg 56a is attached to a flywheel 56 for pivoting about axis 56b and is biased with a spring to pivot inwardly toward the axis of rotation of the flywheel to engage the ratchet. Centrifugal forces generated when the flywheel is rotating at normal engine operating speeds retracts the dawg from the ratchet. The starter is thereby coupled to the crankshaft only during starting, and disengages once the engine is running. A second dawg (not shown) is similarly mounted to the flywheel diametrically opposite dawg 56a.

Carburetor 66, not shown in section, is mounted to the end of the crankcase 51, opposite the crankshaft 50 and on the rear of the trimmer, and aspirates the crankcase in a conventional manner. Air filter 67, generally rectangular in shape, is mounted in air filter housing 19 and is firmly pressed against plate 66a, surrounding the throat (not seen) of the carburetor. Air is drawn into the filter housing between the outer periphery of plate 66a and peripheral flanges, the lower one of which 19a can be seen, of the air filter housing 19. The air then passes through the filter and into the carburetor. Placing the air filter at the very rear of the trimmer moves it far away from dirt and debris kicked up by the rotating line 16 (FIG. 1), which helps to keep the air filter cleaner. Air filter 67 also tends to silence the noise normally associated with air intake into a carburetor. Interior wall 68 of the air filter housing 19 and interior wall 69 of engine housing 17 form a thermal barrier that in addition to directing the flow of cooling gas, help shield the carburetor from heat radiating from the muffler 61 and cylinder during operation.

Fuel tank 20 is generally elongated and mounted below crankcase 50 and carburetor 66. Retention of the tank is accomplished without fasteners. A tongue-shaped forward extension of fuel tank 20a is received within a lower flange portion of blower housing, and rear flange portion 20b is received within a clamp extension 17a of engine housing 17. Fuel from the tank is drawn through filter 20d and delivered to the carburetor through fuel line 20c.

Figure 5:
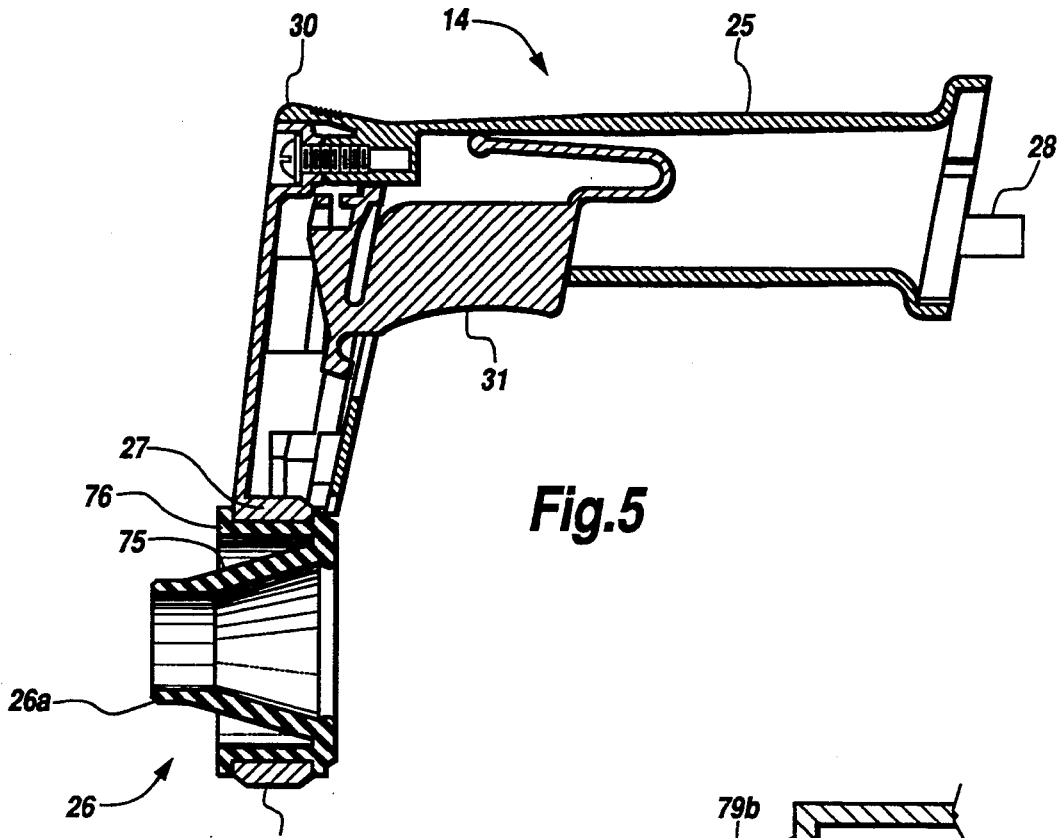
FIG. 5 is an enlarged sectional view taken along line IV—IV, similar to FIG. 4, illustrating the vibration dampening rear support handle.

Referring now to FIG. 5, handle 14 includes dampening member 26 mounted within ring 27 integrally formed in support member 25. The dampening member 26, referred to herein as a rubber spring, is integrally formed of rubber or similar elastomeric material and includes a hollow, conically-shaped portion 75 joining a small annulus 26a and a large annulus 76. The small annulus closely circumscribes and grips the exterior circumference of drive shaft housing 53. The large annulus includes two spaced apart, circular ridges extending outwardly from its outer circumference to receive and firmly hold ring 27 of the support member 25. The structure of the dampening member is specially adapted for use with a handle similar to handle 14. It is compact, of simple construction, and easily assembled with the handle on the drive shaft housing. The conically-shaped portion 75 is resilient so that it tends to maintain separation of ring 27 of the support member 25 and the drive shaft 53 but allows some deflection of the ring in any direction perpendicular to the axis of the drive shaft, including in an upward direction when the trimmer is picked up. The elastomeric material of the dampening member tends to dampen transmission of vibrations to the handle 14 from the drive shaft housing over at least a portion of the range of frequencies associated with normal operation of the trimmer, absorbing some of the vibrational energy. The elastomeric material and the conically-shaped structure of a portion of the dampening member also have spring-like behavior that interacts with the mass of the handle 25 to dampen or impede transmission of vibrations from the drive shaft housing to the handle 14. The shape of the dampening member also ensures that vibrations of the shaft in all directions are dampened equally. Though throttle cable is not shown, throttle trigger 31 is connected to this throttle cable in a conventional manner. Support member 25 also includes integrally formed posts 28.

Figure 6:
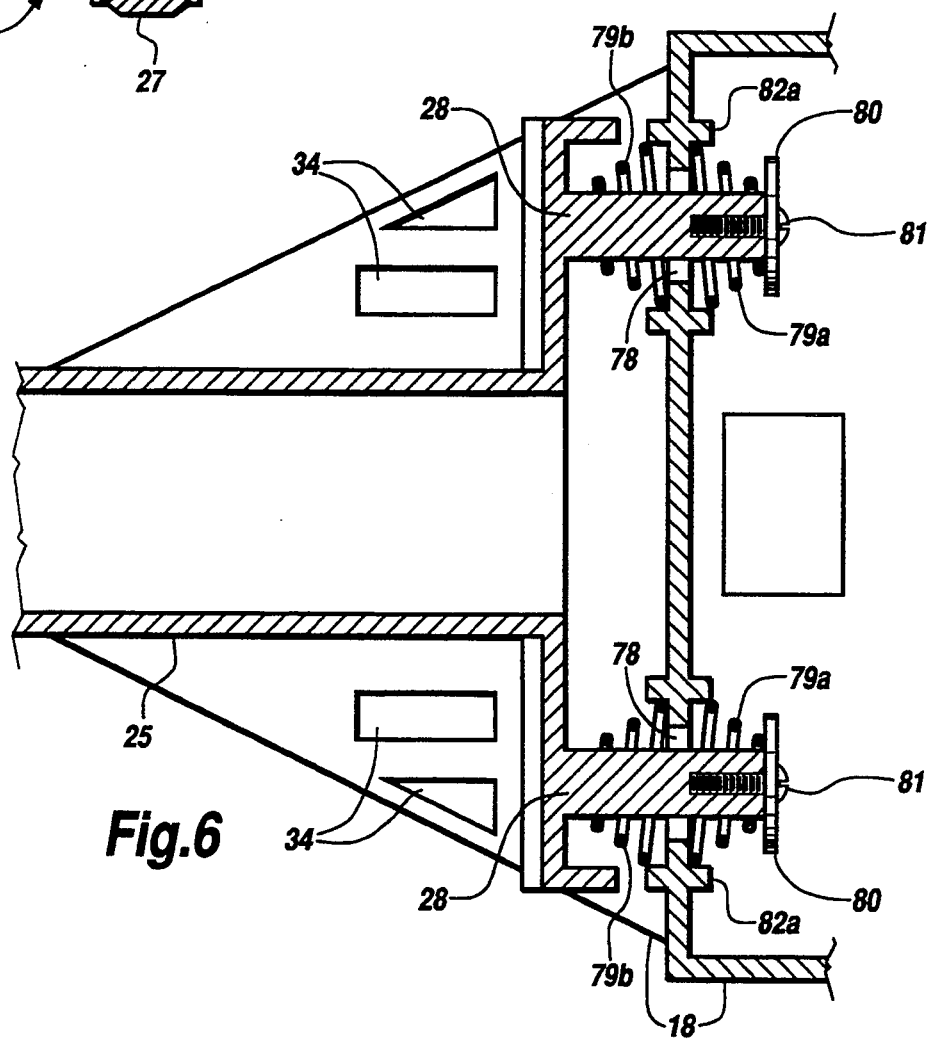
FIG. 6 is an enlarged sectional view taken along line VI—VI of FIG. 2 which illustrates the manner in which the rear support handle is mounted on the power source housing.

Referring now to FIG. 6, the other end of handle 14 is resiliently coupled to blower housing 18 with posts 28 that extend through holes 78 located on blower housing 18. Conically-shaped, coiled steel springs 79a each circumscribe one of the two posts 28 and each is slightly compressed between the interior surface of blower housing 18 and a disc washer 80 retained on the end of the post by screw 81. Shoulders 82a laterally retain the larger end of the spring with respect to the interior surface of the blower housing. A second set of conically-shaped, coiled steel springs 79b each circumscribe one of the posts 28 between the exterior of the blower housing and an inner surface of support member 25. Shoulders 82b laterally retain the larger end of the spring with respect to the exterior of the blower housing. The posts 28 and springs 79a and 79b cooperate to separate posts 28 from blower housing 18 and the blower housing from support member 25. The springs 79a and 79b on each post, in cooperation with the post, blower housing and support member 25, resist movement of the post along the post's axis, as well as any lateral or rotating movement that displaces and rotates the post's axis. The resistance is sufficient to prevent contact between the support member 25 and blower housing and the post and the blower housing during normal operation of the trimmer. The springs and the mass of handle 14 act together to impede transmission of vibrations from the blower housing through the springs to the handle. Use of two spaced apart posts assist, without sacrificing vibration dampening, in stabilizing the handle 14 by providing greater resiliency to torque generated by twisting the handle with respect to the blower housing. The manner in which the forward portion of the handle 14 is coupled to the drive shaft, as shown in FIG. 5, tends to make the handle more vulnerable to this twisting motion.

Referring to FIGS. 1–5, the overall arrangement of the component parts of the trimmer 10 contribute to the balance, compactness, manufacturability and convenience of operation of the trimmer.

The center of gravity for the overall trimmer 10 is below and between the grip portion 22 of the forward assist handle 15 and the hand grip 29 of rear support handle 14. In addition, the engine, carburetor, fuel tank, blower, muffler, starter pulley and drive shaft housing 13 are symmetrical about the vertical plane defined by axes 47 and 59, the trimmer 10 hangs below the handles without any lateral imbalance. This distribution of weight allows the operator to easily support the trimmer 10 in an upright position. Although the center of gravity is between the handles, it is very near the rear handle, and the operator can easily support the trimmer with just one hand, typically when the fuel tank 20 is filled and shifts the center of gravity slightly rearwardly. The length of the handle 14 allows a hand to move slightly forward or backward to improve balance.

Arrangement of the components in the power source 11 results in a narrow profile. The vertical orientation provides the structure needed to attach the rear handle 14 to the crankshaft housing 18.

Since the crankshaft 50, the piston 46, and the rear support handle 14 are substantially disposed in the plane defined by the intersection of the crankshaft axis 59 and the piston axis 47, the imbalanced inertia forces of the engine and the rocking forces of the cantilevered crankshaft fall within this plane. Consequently, the vibrations produced by the power source are concentrated in this plane, allowing dampening members 26 and 79 to work in conjunction to effectively dampen engine induced vibration while minimizing twisting motion to the handle.

Only the preferred embodiment has been described. This embodiment is only an example intended to illustrate the invention. Numerous modifications to this embodiment without departing from the scope and spirit of the invention, which scope is set forth and limited only by what is claimed.

What is claimed is:

1. A flexible line trimmer comprising:
   an internal combustion engine disposed within a power source housing;
   a rotary trimmer head;
   a drive shaft housing having disposed therein for rotation a drive shaft, the drive shaft having a first end operatively coupled to the internal combustion engine and an oppositely disposed end operatively coupled to spin the trimmer head; and
   a generally L-shaped vibration dampening support handle having a first end resiliently coupled to the drive shaft housing, and having a second end resiliently coupled to the power source housing.

2. The flexible line trimmer of claim 1 wherein the support handle comprises:
   a vibration dampening member comprising a resilient spring insulator having a substantially conical, hollow shape having a smaller opening adapted to coaxially circumscribe the outer surface of the drive shaft housing, and having an oppositely disposed larger opening; and
   a support member having a first end portion and a second end portion, the first end portion having an annular configuration adapted to coaxially circumscribe the outer surface of the vibration dampening member near the larger opening, the second end portion of the support member forming the second end of the support handle.

3. The flexible line trimmer of claim 2 further comprising:
   one or more posts extending from the second end portion of the support member;
   one or more external slob on the power supply housing adapted to receive the posts of the support member; and
   one or more resilient coil springs coaxially mounted on each post of the support member, each spring having a substantially conical shape, and having a first end with a diameter adapted to engage in close relationship a post of the support member, and having a second end adapted to maintain the spaced relationship between a post of the support member and the power supply housing.

4. A flexible line trimmer comprising:
   an internal combustion engine;
   a power source housing enclosing the internal combustion engine;
   a trimmer head housing including a rotary trimmer head;
   a hollow drive shaft housing having a first end connected to the trimmer head housing and an oppositely disposed second end connected to the power source housing, including a drive shaft for interconnecting the rotary power source and the trimmer head; and
   a vibration dampening handle having a first end portion resiliently attached to the drive shaft housing, and having a second end portion resiliently attached to the power source housing;
   wherein the internal combustion engine has a vertically oriented cylinder, a piston disposed therein for reciprocal movement along a cylinder axis, and a crankshaft rotated by reciprocating movement of the piston that has a longitudinal axis transverse to the cylinder axis, and that is coupled to the drive shaft; the crankshaft, cylinder, and vibration dampening handle being substantially disposed in a plane defined by the intersection of the longitudinal axis of the crankshaft and the axis of the cylinder.

* * * * *

UNITED STATES PATENT AND TRADEMARK OFFICE
CERTIFICATE OF CORRECTION

PATENT NO. : 5,345,684

DATED : September 13, 1994

INVENTOR(S) : Michael W. Shoup, et al.

It is certified that error appears in the above-identified patent and that said Letters Patent is hereby corrected as shown below:

Col. 8, line 10, change "slob" to --slots--.

Signed and Sealed this

Twenty-eight Day of February, 1995

Attest:

BRUCE LEHMAN

*Attesting Officer*  *Commissioner of Patents and Trademarks*